Patented Sept. 11, 1934

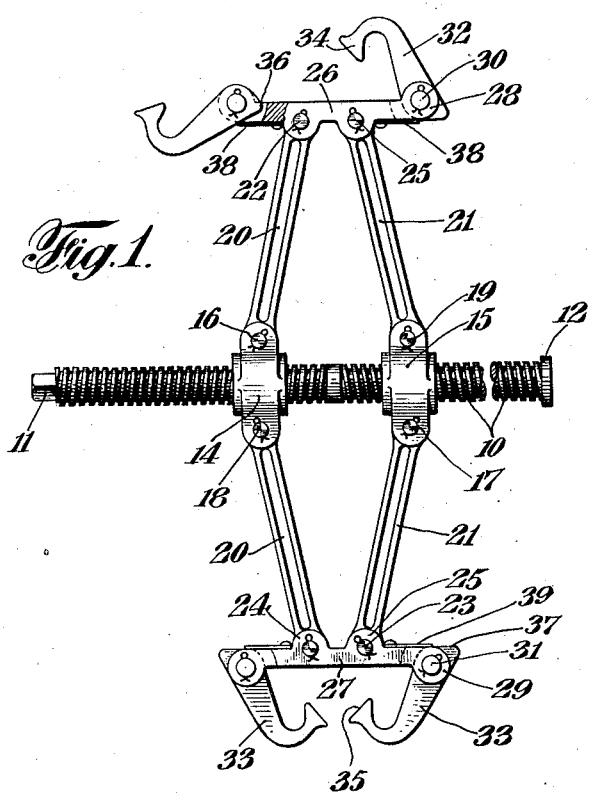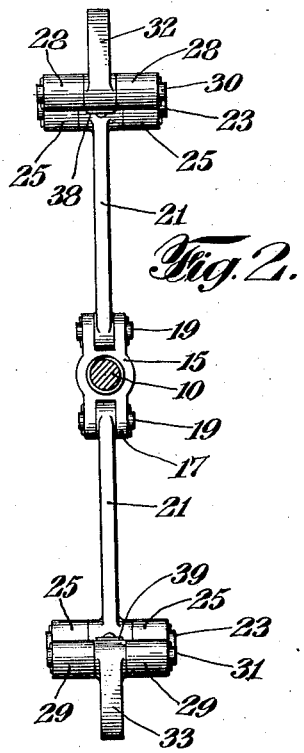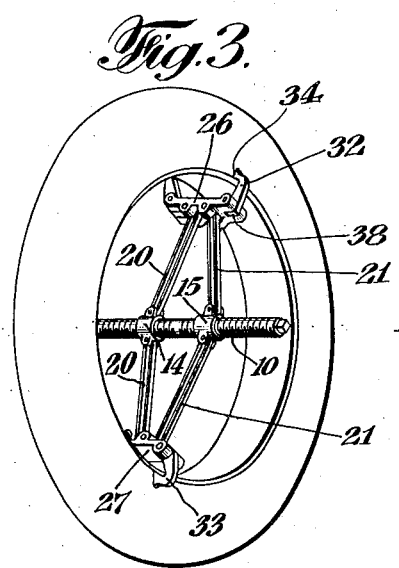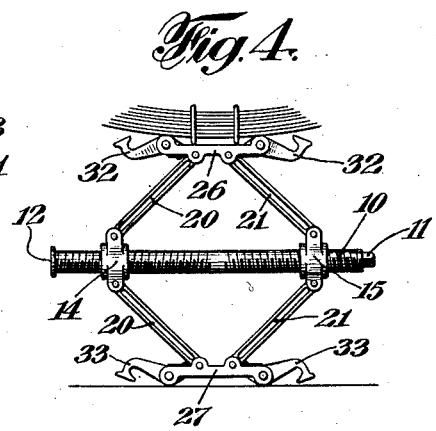

1,973,308

UNITED STATES PATENT OFFICE

1,973,308

COMBINED LIFTING JACK AND TIRE REMOVER

Edward Geistlinger, Peekskill, N. Y., assignor to Air Valve Bottle Corporation, Wilmington, Del., a corporation of Delaware Refiled for abandoned application Serial No. 429,591, February 19, 1930. This application November 1, 1933, Serial No. 696,200

4 Claims. (Cl. 254—126)

This application is refiled for abandoned application, Serial No. 429,591, filed February 19, 1930.

This invention relates to devices capable of length expansion, and also contraction, in a powerful and positive manner.

One of the objects of the invention is to provide an apparatus which is capable of performing a double purpose, in the one instance to function as a lifting jack, and in another as a tire rim remover or for like purposes.

A further feature is in the provision of a combined apparatus adapted to exert force, transmitted by a screw and toggle device, either to raise or spread one element relative to another, or reversely, to draw opposed elements towards one another.

Another aim is to produce a combined jack and tire remover, easily operated for either purpose, capable of assuming a compact condition whereby it may be carried in an automobile tool box; that is powerful in operation, and simple in construction.

These advantageous features are attained by the novel construction and combination of parts hereinafter described and shown in the accompanying drawing, forming a material part of this disclosure, and in which:

Figure 1 is a front elevational view of an embodiment of the invention, one of the hook latches being shown in an inoperative position and the others raised.

Figure 2 is a side elevational view of the same, the actuating screw being shown in section.

Figure 3 is a perspective view showing the apparatus as used in removing a clincher tire rim.

Figure 4 is a side view of the device when used as a lifting jack.

The apparatus includes in its structure a screw 10 having on one portion a right hand thread and on the other a left hand thread, these threads meeting at about the center of the length of the screw, one end of which is finished with a wrench or handle receiving extension 11 and the other with an outstanding flange 10 to act as a limit stop.

Threaded on the respective sections of the screw rod 10 are screw collars 14—15 having opposed forked lateral extensions 16—17, in which, pivoted on pins 18—19 are pairs of links 20 and 21.

The links 20—21 are pivoted on pins 22—23 between forked lugs 24—25 on the adjacent sides of blocks 26—27 having forked ends 28—29.

Pivotally mounted on pins 30—31 passing through the end forks are pairs of catch-hooks 32—33, their outer, free ends terminating in inturned hooks 34—35 while at their rounded pivoted ends are flat straight surfaces 36—37 disposed at an angle less than 90 degrees with the straight outer surfaces of these members.

Riveted or otherwise secured to the under sides of the blocks 26—27 are flat springs 38—39, their free outer ends impinging normally on the surfaces 36—37, retaining the catch-hook pairs convergently inclined, as best seen in Fig. 1.

When these catch members are forced outwardly as seen in the same figure and also Figure 4, the springs contact the outer edge surfaces of the catches, preventing them from hanging pendant.

From the foregoing it will be understood that the hook catches may be engaged on opposite sides of a tire rim, see Figure 3, and that upon applying a wrench to rotate the screw, these hooks will draw the rim inwardly to effect ready removal or replacement of a tire, holding the rim firmly as long as may be desired, relaxing of the rim being accomplished by reversing the direction of rotation of the screw.

When used as a lifting jack, as shown in Figure 4, the several hooks are turned outwardly on their pivots to rest upon the springs and the screw actuated in the usual manner, limited by the stop 12, contacting the collar 14; it is to be noted that when the collars are at their outer limits, the blocks and hook catches are quite close so that a minimum of room is taken for storage.

It is further noted that all of the several elements used in the structure, except the screw and internally threaded collars, are duplicates and held on their pivots by cotter pins, thus being readily removable for substitution should occasion arise.

Although the foregoing is descriptive of the preferred embodiment of the invention, it will be apparent that minor changes may be made in its construction, without departing from the scope of the claims appended hereto.

Having thus described the invention, what is claimed as new and desired to secure by Letters Patent, is:—

1. A lifting jack comprising screw actuated toggle device, straight elongated end blocks pivoted to the outer ends of the toggle device element to be retained in parallel thereby, pairs of hooks pivoted in the ends of each block, the hubs of said hooks being adapted for use as pressure elements and resilient members fixed on said end blocks to retain the hooks in fully retracted and engaged positions selectively.

2. A lifting jack comprising a screw having right and left hand threaded portions, collars engaged on the respective threaded portions, a pair of opposed duplicate blocks having forked lugs, connecting links pivoted at their ends respectively in said collars and block lugs whereby said blocks are maintained parallel and moved towards and from each other, and hooks pivoted in opposed relation between the lugs of said blocks to swing in various relative angular positions said hooks having contact elements adapted to exert pressure towards and from the axis of said screws.

3. A lifting jack comprising a screw having right and left hand threaded portions, collars engaged on the respective threaded portions, a pair of opposed duplicate blocks having forked lugs on their ends, pairs of bars pivotally connected between said collars and the lugs of said blocks, elongated catch hooks pivoted between the end lugs of the block, and flat springs carried by said blocks to retain said catch hooks in either of their adjusted positions.

4. A lifting jack comprising a screw having right and left hand threaded portions, collars engaged on the respective threaded portions of said screw, means receptive of a wrench on one end of said screw, a limit stop on the other end to abut one of said collars when moved thereagainst, pairs of connecting bars pivoted in opposed relation to said collars, a pair of like contact blocks pivoted to the respective ends of said bars, pairs of hook catches having angular hubs pivoted in the opposite ends of said blocks, and means engaged with said hubs to retain said hooks in adjusted positions.

EDWARD GEISTLINGER.